US011986000B2

(12) United States Patent
O'Regan et al.

(10) Patent No.: US 11,986,000 B2
(45) Date of Patent: May 21, 2024

(54) WHEY PROTEIN EXTRACTS AND THEIR USE AS SPHINGOMYELIN SOURCE

(71) Applicant: SOCIETE DES PRODUITS NESTLE S.A., Vevey (CH)

(72) Inventors: Jonathan O'Regan, Killarney (IE); Terence Cian Moloney, Cork (IE); Francesca Giuffrida, Mezieres (CH)

(73) Assignee: Societe des Produits Nestle S.A., Vevey (CH)

( * ) Notice: Subject to any disclaimer, the term of this patent is extended or adjusted under 35 U.S.C. 154(b) by 245 days.

(21) Appl. No.: 16/610,271

(22) PCT Filed: May 1, 2018

(86) PCT No.: PCT/EP2018/061064
§ 371 (c)(1),
(2) Date: Nov. 1, 2019

(87) PCT Pub. No.: WO2018/202636
PCT Pub. Date: Nov. 8, 2018

(65) Prior Publication Data
US 2020/0245669 A1 Aug. 6, 2020

(30) Foreign Application Priority Data
May 3, 2017 (EP) ..................... 17169199

(51) Int. Cl.
*A23L 33/19* (2016.01)
*A23J 3/08* (2006.01)
*A23L 33/00* (2016.01)

(52) U.S. Cl.
CPC ............... *A23L 33/19* (2016.08); *A23J 3/08* (2013.01); *A23L 33/40* (2016.08); *A23V 2002/00* (2013.01)

(58) Field of Classification Search
CPC ...... A23V 2002/00; A23V 2250/54252; A23V 2250/54242; A61K 2300/00; A23L 33/40; A23L 33/19; A23J 3/08
See application file for complete search history.

(56) References Cited

U.S. PATENT DOCUMENTS 6,312,755 B1 11/2001 Wu
2003/0124237 A1* 7/2003 Kuhlman ............. A23C 9/1512
426/580

(Continued)

FOREIGN PATENT DOCUMENTS

CN 101415429 A 4/2009
CN 107920574 A 4/2018

(Continued)

OTHER PUBLICATIONS

Sánchez-Juanes et al., "Distribution and Fatty Acid Content of Phospholipids From Bovine Milk and Bovine Milk Fat Globule Membranes", International Dairy Journal, vol. 19, Issue 5, 2009, pp. 273-278.

(Continued)

*Primary Examiner* — Hong T Yoo
(74) *Attorney, Agent, or Firm* — K&L Gates LLP

(57) ABSTRACT

Use of an α-lactalbumin enriched whey protein extract as a source of sphingomyelin in a synthetic nutritional composition for an infant or child wherein, the α-lactalbumin enriched WPE is obtained by a process comprising: a. acidifying a whey protein product to pH 4 or below b. forming a low calcium whey protein product by concentrating the proteins in the acidified whey protein until the calcium to protein ratio is less than about 0.001 and, c. Precipitating α-lactalbumin from the low-calcium whey protein product, wherein said precipitating step includes the sub-steps of: I. diluting the low-calcium whey protein product, II. adjusting the pH of the diluted low-calcium whey (Continued)

protein product to between 4 and 5 to form a precipitate and soluble proteins, and III. Separating the precipitate proteins from the soluble proteins.

11 Claims, 2 Drawing Sheets

(56) References Cited

U.S. PATENT DOCUMENTS

| | | |
|---|---|---|
| 2016/0158287 A1 | 6/2016 | Lonnerdal et al. |
| 2017/0013869 A1 | 1/2017 | Lonnerdal et al. |
| 2017/0027214 A1 | 2/2017 | Affolter et al. |

FOREIGN PATENT DOCUMENTS

| | | | | |
|---|---|---|---|---|
| EP | 0443763 B1 * | 6/1995 | ............. | A23C 11/00 |
| JP | 2000350563 A | 12/2000 | | |

OTHER PUBLICATIONS

Jian-Hang et al., "Research Progress on Humanization of Infant Formula Proteins", China Dairy Industry, vol. 44, Issue 9, 2016, pp. 31-46.

Office action received for Chinese application No. 201880025354.8, dated Aug. 19, 2022, 18 pages. (10 pages of English translation and 8 pages of original copy).

Zhang, "Complete Book for Scientific Parenting", 2017, p. 125.

Zhang, "Complete Book for Scientific Parenting", 2017, pp. 115-116.

Chinese Office Action for Chinese Appl No. 201880025354.8 dated Aug. 19, 2022.

English Translation of the relevant paragraph of Zhang, "Complete Book for Scientific Parenting", 2017, p. 125.

English Translation of the relevant paragraph Zhang, "Complete Book for Scientific Parenting", 2017, pp. 115-116.

* cited by examiner

WHEY PROTEIN EXTRACTS AND THEIR USE AS SPHINGOMYELIN SOURCE

FIELD OF THE INVENTION

The present invention relates to the use of an α-lactalbumin enriched whey protein extract as a source of sphingomyelin, and to the use of said α-lactalbumin enriched whey protein extract to optimise the 5 sphingomyelin concentration in a synthetic nutritional composition for an infant or child. The invention further relates to the use of said synthetic nutritional composition for an infant or child to support and/or optimise growth and development, including neurodevelopment and cognitive development, in an infant or child.

BACKGROUND TO THE INVENTION

Breast-feeding is recommended for all infants. However, in some cases breast-feeding is insufficient or not possible for medical reasons. In these situations infant formula can be used as a substitute for breast milk. However, studies have shown that the composition of infant formula is not identical to that of breast-milk, and that it may not always have identical effects on the body. In light of this, and in light of the fact that breast-milk is considered the gold standard when it comes to infant nutrition, a goal of infant formula manufacturers is to further develop the compositions of their infant formulas and to bring them closer to breast milk.

Sphingomyelin is a compound whose concentration can differ between infant formula and breast-milk, with the level in breast-milk usually far exceeding that found in infant formula. This can result in formula-fed infants having a lower sphingomyelin intake which may have negative effects on their growth and development, including neurodevelopment and cognitive development. In an effort to address this gap, infant formula manufacturers have aimed to increase the concentration of sphingomyelin in their infant formulas. However, this can pose a challenge. Commonly used sources of sphingomyelin in infant formula e.g. dairy-derived ingredients such as whey protein or extracts thereof, often only comprise sphingomyelin in low concentrations, and this makes it is impossible to use them in infant formula in the concentrations required to supply a sufficient amount of sphingomyelin without providing an excess of another ingredient such as protein, and/or without having to reduce the quantities of other important nutrients in the infant formula composition. Whilst sources of pure or essentially pure sphingomyelin are available, these are often unsuitable for use in infant formula e.g. are brain derived, or are scarce and difficult to source.

Accordingly, there is a need to identify ingredients that can be used in infant formulas as a source of sphingomyelin that do not suffer from one or more of the drawback listed above.

Surprisingly, the inventors have now found that an α-lactalbumin enriched whey protein extract (hereinafter an α-lactalbumin enriched WPE) produced by a particular process detailed herein, may comprise sphingomyelin in a concentration far higher than that found in α-lactalbumin enriched whey protein extracts produced by other methods. This advantageously enables this particular α-lactalbumin enriched whey protein extract to be used as a source of sphingomyelin and to optimise the concentration of sphingomyelin in a composition for an infant or child.

SUMMARY OF THE INVENTION

The invention is set out in the claims and in further detail in the detailed description included herein.

The present invention encompasses the use of an α-lactalbumin enriched whey protein extract as a source of sphingomyelin in a synthetic nutritional composition for an infant or child wherein, the α-lactalbumin enriched WPE is obtained by a process comprising:
  a. acidifying a whey protein product to pH 4 or below,
  b. forming a low calcium whey protein product by concentrating the proteins in the acidified whey protein until the calcium to protein ratio is less than about 0.001 and,
  c. Precipitating α-lactalbumin from the low-calcium whey protein product, wherein said precipitating step includes the sub-steps of:
    I. diluting the low-calcium whey protein product,
    II. adjusting the pH of the diluted low-calcium whey protein product to between 4 and 5 to form a precipitate and soluble proteins, and
    III. Separating the precipitate proteins from the soluble proteins.

The α-lactalbumin enriched WPE obtained by this process has been found to be surprisingly rich in sphingomyelin and may advantageously be used to optimise the sphingomyelin concentration in a synthetic nutritional composition for an infant or child. The α-lactalbumin enriched whey protein extract may be added to a synthetic nutritional composition in an effective amount, sufficient to ensure that the said composition has a final concentration of sphingomyelin in a range found in human breast milk.

The α-lactalbumin enriched WPE is also a rich source of α-lactalbumin, because of this, it may also be used to optimise the concentration of α-lactalbumin in said synthetic nutritional composition for an infant or child, and may be added to said composition in an effective amount sufficient to provide α-lactalbumin in one of the ranges found in human breast milk.

The invention also provides a synthetic nutritional composition comprising the α-lactalbumin enriched WPE, obtained as detailed herein, in a concentration of 0.8 to 8 g/L. A composition may for example comprise 4 to 5 g/L of the α-lactalbumin enriched WPE and may be formulated for an infant of 6 to 12 months of age, or may be formulated for an child of 12 to 36 months of age. A composition may for example comprise 0.5 to 1.5 g/L of the α-lactalbumin enriched WPE and may be formulated for a child of 3 to 8 years of age. The sphingomyelin concentration in said compositions may be at least 57 mg/L.

The synthetic nutritional composition for an infant or child may be a composition for consumption by infants either alone or in combination with human breast milk, and may be an infant formula or human breast milk fortifier.

The α-lactalbumin enriched WPE obtained as described herein, or a synthetic nutritional composition comprising it, may be used to provide an infant or child with an optimized amount of sphingomyelin, it may also be used to support and/or optimise the neurodevelopment and/or cognitive development of an infant or child, or in the treatment and/or prevention of sub-optimal neurodevelopment and/or cognitive development of an infant or child.

Because the α-lactalbumin enriched WPE obtained as described herein, or a synthetic nutritional composition comprising it, may also be used to provide an infant or child with an optimised amount of α-lactalbumin, it may also be used to support and/or optimise the growth of an infant or child, or in the treatment or prevention of sub-optimal growth of an infant or child.

The invention will now be described in further detail.

DETAILED DESCRIPTION

Figure 1:
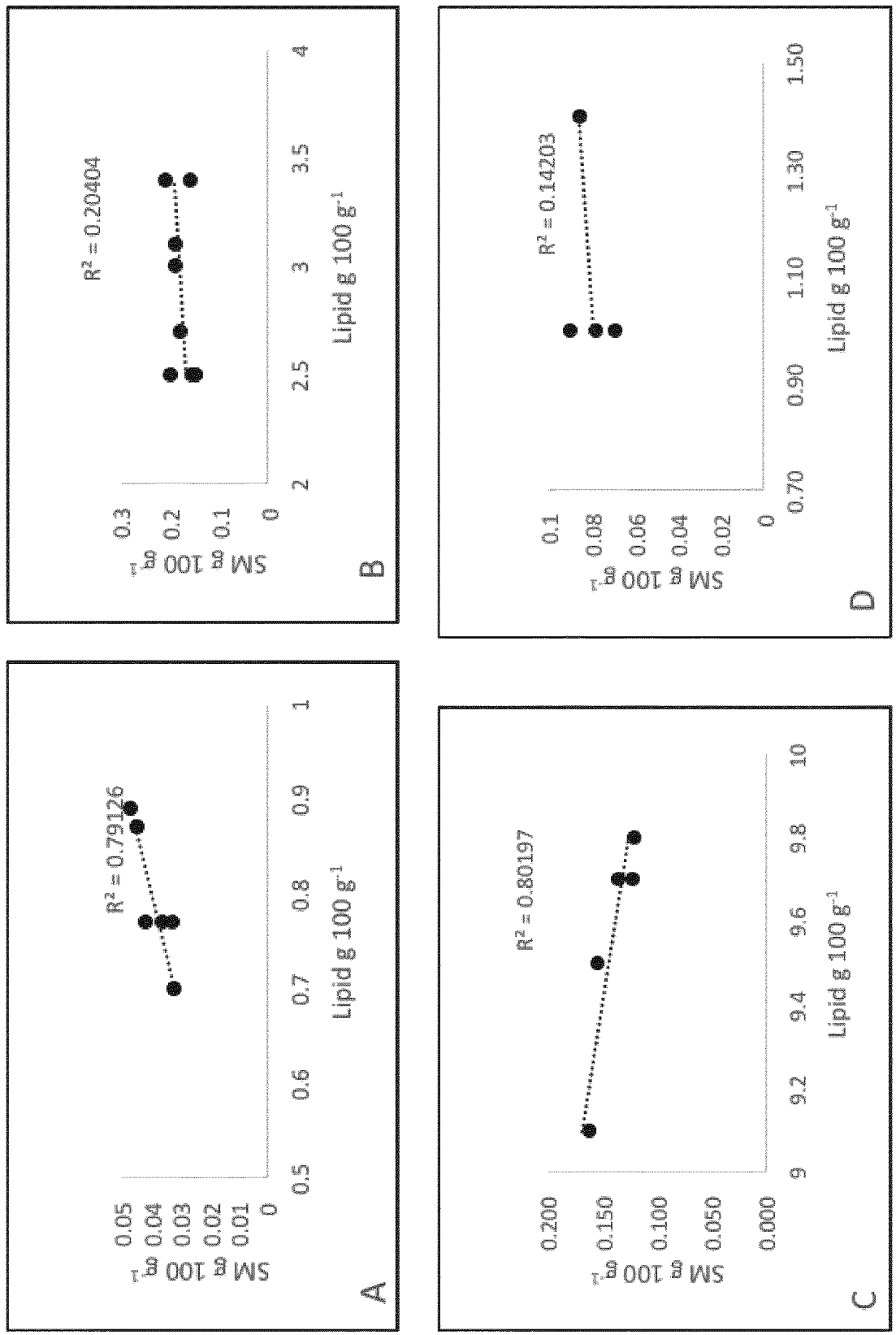
FIG. 1. Shows scatter plots showing the correlation between SM and lipid contents for (A) SMP ingredients; (B) WPC 35% protein ingredients; (C) α-lac A ingredient; (D) α-lac B ingredient. The data was fit linearly and the regression coefficient (R 2) values calculated.

In a first aspect of the present invention there is provided the use of an α-lactalbumin enriched WPE as a source of sphingomyelin in a synthetic nutritional composition for an infant or child wherein, said α-lactalbumin enriched WPE is obtained by a process comprising:
  a. acidifying a whey protein product to pH 4 or below for example a pH in the rage 3.3 to 3.8 such as pH 3.5,
  b. forming a low calcium whey protein product by concentrating the proteins in the acidified whey protein until the calcium to protein ratio is less than about 0.001 for example by ultrafiltration e.g. through a IOK-IOOK molecular weight cut off membrane, and/or diafiltration, and
  c. Precipitating α-lactalbumin from the low-calcium whey protein product, wherein said precipitating step includes the sub-steps of:
    I. diluting the low-calcium whey protein product,
    II. adjusting the pH of the diluted low-calcium whey protein product to between 4 and 5 to form a precipitate and soluble proteins, and
    III. Separating the precipitate proteins from the soluble proteins for example by ultrafiltration e.g. through a SK-SOK molecular weight cut off membrane, and/or by diafiltration.

In step a, the whey protein product may be acidified by the addition of an acid. The acid may be a food grade acid e.g. hydrochloric acid, phosphoric acid, citric acid, and/or sulfuric acid. If a whey protein powder is used as the whey protein product, this must be brought into solution prior to step a.

The whey protein product may be a whey protein concentrate prepared in any conventional way from mammalian whey (sweet or acid whey) for example cow, goat, sheep, buffalo, water buffalo, yak, human, llama and/or mouse whey. A whey protein concentrate may for example be obtained from skimmed and/or clarified bovine whey that has been concentrated and/or desalted by common means, e.g. by ultrafiltration (the whey protein product may be the retentate) and/or diafiltration.

A process for obtaining an α-lactalbumin enriched WPE for use in the invention detailed herein is described in U.S. Pat. No. 6,312,755, the contents of which is hereby incorporated by reference.

The α-lactalbumin enriched WPE obtained by the process set out hereinabove comprises sphingomyelin in a concentration in a range of 1.1 to 1.8 g per 100 g of protein, for example in a range of 1.4 to 1.6 g per 100 g of protein. This is far higher than the sphingomyelin concentration found in α-lactalbumin enriched WPE obtained from other processes.

Accordingly in an embodiment of the present invention the α-lactalbumin enriched WPE is rich in sphingomyelin and comprises at least 1.1 g of sphingomyelin per 100 g of protein for example more than 1.4 g of sphingomyelin per 100 g of protein.

The term "sphingomyelin" as used herein refers to a lipid molecule, or mixture of lipid molecules, wherein a sphingosine or a sphinganine backbone is esterified with a fatty acid residue at the amino group (—NH2) through an amide bond and wherein the hydroxyl group at position 1 of the sphingosine backbone is linked to a phosphorylcholine moiety. For example sphingomyelin may be a compound of formula (I) or a mixture of compounds of formula (I)

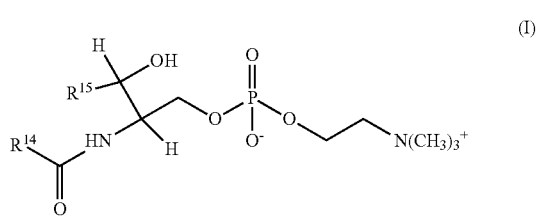

(I)

Wherein
R$^{14}$ is a C2 to C43 branched or unbranched acyclic alkyl, or acyclic alkenyl group,
R$^{15}$ is a C2 to C43 branched or unbranched acyclic alkyl, or acyclic alkenyl group.

For example R$^{14}$ may be a C13 to C43 branched or unbranched acyclic alkyl, or acyclic alkenyl group which together with the adjacent carbonyl group corresponds to a C14 to C44 saturated or unsaturated fatty acid residue.

Non limiting examples of C14 to C44 saturated or unsaturated fatty acids from which the fatty acid residue 10 may stem include; C14:0, C15:0, C16:0, C18:0, C20:0, C21:0, C22:0, C23:0, C24:1, C25:0, C28:1, C30:2, C30:1, C30:0, C32:3, C32:2, C32:1, C32:0, C33:1, C34:3, C34:2, C34:1, C34:0, C35:2, C35:0, C36:4, C36:3, C36:2, C36:1, C36:0, C37:1, C37:0, C38:4, C38:3, C38:1, C38:0, C39:1, C39:0, 040:2, C40:1, C40:0, C41:2, C41:1, C41:0, C42:47, C42:3, C42:2, C42:1, C42:0, C44:3, C44:I.

The α-lactalbumin enriched WPE is particularly suitable for use as a source of sphingomyelin in a synthetic nutritional composition for an infant or child e.g. an infant formula or composition for consumption by an infant or child either alone or in combination with human breast milk. As previously stated herein, it is known that the sphingomyelin concentration can differ between breast milk and infant formula; given the positive wellness effects associated with an adequate sphingomyelin intake, there is a need to optimise the sphingomyelin concentration in said compositions.

In another aspect of the present invention there is provided the use of an α-lactalbumin enriched WPE to optimise the sphingomyelin concentration of a synthetic nutritional composition for an infant or child wherein said α-lactalbumin enriched WPE is obtained by a process as detailed herein.

The α-lactalbumin enriched WPE may be added to a synthetic nutritional composition in any amount effective (an effective amount) to optimise the concentration of sphingomyelin in said synthetic nutritional composition for an infant or child.

Given that human breast milk is the gold standard when it comes to infant and/or child nutrition, the concentration of sphingomyelin in a synthetic nutritional composition for an infant or child may be considered optimised if the concentration of sphingomyelin is within a range, or above a range, found in human breast milk.

Sphingomyelin has be found to be present in breast milk in a concentration range of about 14 to 320 mg/L for example 24.5-177.4 mg/L, and most commonly in a concentration range of 54 mg/L to 177.4 mg/L for example 54.6 mg/L to 87 mg/L.

Accordingly, an effective amount of the α-lactalbumin enriched WPE may be an amount sufficient to provide sphingomyelin in one or more of these ranges or in a higher concentration. An effective amount may also be an amount sufficient to ensure that the synthetic nutritional composition has a final concentration of sphingomyelin in one or more of these ranges or in a higher concentration when considering other ingredients comprised in the composition that comprise sphingomyelin e.g. dairy ingredients such as skimmed milk powder and whey protein. Said ingredients may comprise sphingomyelin innately.

It is well within the purview of the person skilled in the art to determine an effective amount of the α-lactalbumin enriched WPE, to be added to the synthetic nutritional composition for an infant or child, based upon the amount of sphingomyelin found in human breast milk and the concentration of sphingomyelin in the α-lactalbumin enriched WPE, and when applicable the concentration of sphingomyelin coming from other ingredients comprised in the synthetic nutritional composition for an infant or child.

The optimised concentration of sphingomyelin may be the concentration of sphingomyelin in the synthetic nutritional composition upon reconstitution for example with milk or water. It is well within the purview of the skilled person to determine an effective amount taking into consideration the concentration of sphingomyelin in the α-lactalbumin enriched WPE and when appropriate reconstitution instructions for the synthetic nutritional composition.

A particular advantage of the α-lactalbumin enriched WPE used in the invention is that it can provide an optimised amount of sphingomyelin to a synthetic nutritional composition for an infant or child and negate the need to add additional ingredients for this purpose, for example additional ingredients whose addition would be for the sole or primary purpose of increasing the sphingomyelin concentration e.g. whey protein concentrates enriched in milk fat globule membrane (MFGM). Accordingly, in an embodiment the α-lactalbumin enriched WPE is not used in combination with an additional ingredient whose sole or primary purpose would be to increase the sphingomyelin concentration in the synthetic nutritional composition, for example it is not used in combination with a whey protein concentrate enriched in MFGM.

The term "infant" as used herein refers to a human infant of up to 12 months of age and includes preterm and very preterm born infants, infants having a low birth weight i.e. a new born having a body weight below 2500 g (5.5 pounds) either because of preterm birth or restricted fetal growth, and infants born small for gestational age (SGA) i.e. babies with birth weights below the 10th percentile for babies of the same gestational age.

The term "child" as used herein refers to a human of 1 to 18 years of age, for example a human of 1 to 8 years of age, a human of 1 to 3 years of age, and/or a human of 1 to 2 years of age.

A "preterm" or "premature" means an infant or young child that was not born at term. Generally it refers to an infant born prior to the completion of 37 weeks of gestation.

The α-lactalbumin enriched WPE formed by the process described herein also serves as a source of protein for example α-lactalbumin and β-lactoglobulin.

The α-lactalbumin enriched WPE obtained by this process set out hereinabove comprises α-lactalbumin in a concentration in the range of about 28% to 40% of the total protein, for example about 28% to 36% of total protein, and 6-lactoglobulin in a concentration in the range of about 8% to about 33% of the total protein, for example 10% to about 29% of total protein. The percentage of α-lactalbumin in the α-lactalbumin enriched WPE is greater than the percentage of β-lactoglobulin, for example the β-lactoglobulin concentration is not greater than the percentage of the α-lactalbumin content minus 7%.

All percentages disclosed herein with respect to the α-lactalbumin enriched WPE are on a w/w basis unless stated otherwise.

A particular advantage of the α-lactalbumin enriched WPE used in the invention is that its sphingomyelin 5 and α-lactalbumin concentrations are such that it is possible to optimise the sphingomyelin concentration in a synthetic nutritional composition for an infant or child at the same time as optimising the α-lactalbumin concentration.

α-lactalbumin is the dominant whey protein found in human breast milk with a concentration of 1.6-3.8 g/L, it is a protein that is rich in essential amino acids, and is believed to be important for optimum growth and development in infants and children, and is thought to play a role in gastrointestinal (GI) health, reducing for example constipation, reflux and vomiting.

In an embodiment of the invention the α-lactalbumin enriched WPE is simultaneously used to optimise the concentration of sphingomyelin and to optimise the concentration of α-lactalbumin in a synthetic nutritional composition for an infant or child.

The term "optimised concentration of α-lactalbumin" as used herein refers to a concentration of α-lactalbumin that is within a range found in human breast milk (1.6-3.8 g/L). The α-lactalbumin enriched WPE may be considered to optimise the concentration of α-lactalbumin in a synthetic nutritional composition if the α-lactalbumin concentration for the synthetic nutritional composition is within the range found in human breast milk, when considering other ingredients comprised in the composition that comprise α-lactalbumin e.g. dairy ingredients such as skimmed milk powder and whey protein. Said ingredients may comprise α-lactalbumin innately.

It is well within the purview of the person skilled in the art to determine an effective amount of the α-lactalbumin enriched WPE, to be added to the synthetic nutritional composition for an infant or child, based upon the amount of sphingomyelin and α-lactalbumin found in human breast milk and the concentration of sphingomyelin and α-lactalbumin in the α-lactalbumin enriched WPE, and when applicable the concentration of sphingomyelin and/or α-lactalbumin coming from other ingredients comprised in the synthetic nutritional composition for an infant or child e.g. skimmed milk powder.

The optimised concentrations of sphingomyelin and α-lactalbumin may be the concentrations of sphingomyelin and α-lactalbumin in the synthetic nutritional composition upon reconstitution for example with milk or water. It is well within the purview of the skilled person to determine an effective amount taking into consideration the concentration of sphingomyelin and α-lactalbumin in the α-lactalbumin enriched WPE, and when appropriate reconstitution instructions for the synthetic nutritional composition.

The α-lactalbumin enriched WPE may for example be used in an amount sufficient to provide 1g to 1.2 g of protein per 100 available kilocalories equating to 0.28 to 0.48 g of α-lactalbumin per 100 available kilocalories or 1.88 to 3.23 g of α-lactalbumin/L and 74 to 120 mg/L of sphingomyelin/L.

In another aspect of the present invention there is provided a synthetic nutritional composition for an infant or child comprising an α-lactalbumin enriched whey protein extract obtained as disclosed herein.

In an embodiment the synthetic nutritional composition comprises the α-lactalbumin enriched WPE in a concentration within a range of 0.8 to 10 g/L for example 0.8 to 8, 0.8 to 5 g/L, 0.85 to 4.5 g/L, 3 to 4.5 g/L.

In an embodiment at least 10% of the total sphingomyelin in the synthetic nutritional composition comes from the α-lactalbumin enriched WPE for example 10 to 100%, 49% to 100%, 49% to 70%.

The synthetic nutritional composition comprises sphingomyelin in a concentration in a range found in human breast milk or in a higher concentration. Accordingly, the synthetic nutritional composition may comprise sphingomyelin in a concentration of 54 mg/L or higher, for example the composition may comprise sphingomyelin in a concentration of 58 mg/L to 161 mg/L, 58 to 150 mg/L, 58 mg/L to 120 mg/L.

In another embodiment of the present invention the composition also comprises alpha lactalbumin in a concentration within a range found in human breast milk for example in a range of 1.6 to 3.8 g/L, for example 1.7 to 3 g/L.

A goal of infant formula manufacturers is to mimic the composition of human breast milk. However, the composition of human breast milk is extremely dynamic and changes over time. For this reason synthetic nutritional compositions for infants or children are usually stage based with a particular stage being suitable for use in infants or children falling within a particular age range e.g. stage 1 may be aimed at infants of 0 to 6 months, stage 2 may be aimed at infants of 6 months to 12 months, stage 3 may be aimed at children of 12 to 36 months, stage 4 may be aimed at children of 3 to 8 years. Each stage is formulated so that its composition is considered nutritionally sound with respect to the age range of the infant or child to whom it is directed.

In an embodiment of the present invention there is provided a synthetic nutritional composition for an infant or child comprising 9 to 10 g/L of the α-lactalbumin enriched WPE used in the invention for example 9.5-10.2 g/L. In an embodiment said composition is formulated for an infant of 0 to 6 months. In a more specific embodiment the total concentration of sphingomyelin in said composition is at least 90 mg/L and more specifically in a range of 92 to 161 mg/L.

In another embodiment of the present invention there is provided a synthetic nutritional composition for an infant or child comprising 4 to 5 g/L of the α-lactalbumin enriched WPE used in the invention. In an embodiment said composition is formulated for an infant of 6 to 12 months. In a more specific embodiment the total concentration of sphingomyelin in said composition is at least 58 mg/L and more specifically in a range of 58 to 116 mg/L. In an even more specific embodiment the sphingomyelin stemming from the α-lactalbumin enriched WPE accounts for at least 50% of the total sphingomyelin in the composition for example 55% to 75%. The composition may contain 1.6 g/L to 3 g/L of α-lactalbumin for example it may contain 1.5 to 2.5 g/L of α-lactalbumin.

In another embodiment of the present invention there is provided a synthetic nutritional composition for an infant or child comprising 3 to 4 g/L of the α-lactalbumin enriched WPE used in the invention. In an embodiment said composition is formulated for a child of 12 to 36 months. In a more specific embodiment the total concentration of sphingomyelin in said composition is at least 57 mg/L and more specifically in a range of 57 to 116 mg/L. In an even more specific embodiment the sphingomyelin stemming from the α-lactalbumin enriched WPE accounts for at least 45% of the total sphingomyelin in the composition for example at 45% to 65%. The composition may contain 1.6 g/L to 3 g/L of α-lactalbumin for example it may contain 1.5 to 2.5 g/L of α-lactalbumin.

In another embodiment of the present invention there is provided a synthetic nutritional composition for an infant or child comprising 0.5 to 1.5 g/L of the α-lactalbumin enriched WPE used in the invention. In an embodiment said composition is formulated for a child of 3 to 8 years. In a more specific embodiment the total concentration of sphingomyelin in said composition is at least 57 mg/L and more specifically in a range of 65 to 145 mg/L. In an even more specific embodiment the sphingomyelin stemming from the α-lactalbumin enriched WPE accounts for at least 10% of the total sphingomyelin in the composition for example at least 10% to 20%. The composition may contain 1.6 g/L to 3 g/L of α-lactalbumin for example it may contain 2.5 to 3 g/L of α-lactalbumin.

The synthetic nutritional composition for an infant or child can also comprise any other ingredients or excipients known to be employed in the type of synthetic nutritional composition in question e.g. infant formula.

Non limiting examples of such ingredients include: other proteins, amino acids, carbohydrates, oligosaccharides, lipids, prebiotics or probiotics, essential fatty acids, nucleotides, nucleosides, vitamins, minerals and other micronutrients.

Other suitable and desirable ingredients of synthetic nutritional compositions, that may be employed in the synthetic nutritional compositions for infants or children are described in guidelines issued by the Codex *Alimentarius* with respect to the type of synthetic nutritional composition in question e.g. Infant formula, growing up milk, HM fortifier, follow on formula, or food stuffs intended for consumption by infants e.g. complementary foods.

The α-lactalbumin enriched whey protein extract may be added to a synthetic nutritional composition for an infant or child by simply mixing it with other ingredients included in the composition.

Non limiting examples of synthetic nutritional compositions for an infant or child are infant formula, a growing up milk, a composition for infants that is intended to be added or diluted with human breast milk, or a food stuff intended for consumption by an infant and/or child either alone or in combination with human breast milk.

α-lactalbumin is rich in essential and conditionally essential amino acids. Accordingly, the α-lactalbumin enriched WPE of the invention is particularly suitable in low protein synthetic nutritional compositions for infants and children because for a minimal protein intake said infants and children still intake sufficient amino acids to optimise growth and development i.e. be within standard growth curves e.g. WHO standard growth curves.

The α-lactalbumin enriched WPE used in the present invention and obtained by the process described herein contains a minimum amino acid concentration, in grams per 100 grams of total protein, as follows: arginine 3.1; cystine 1.4; histidine 1.6; isoleucine 1.0; leucine 5.3; lysine 3.9; methionine 0.3; phenylalanine 1.2; threonine 3.2; tryptophan 1.5; tyrosine 0.9; and valine 1.0. Accordingly, it may not be necessary to add amino acids to the synthetic nutritional compositions for infants or children when using this α-lactalbumin enriched WPE. The non-protein nitrogen content may be about 15% or less of total nitrogen. The total protein content may be between about 12.5% to about 95% for example 35% to 80% or 73% to 77%. The fat content may be about 15% or less. The ash content may be about 4.5% or less.

In an embodiment the synthetic nutritional composition is a low protein infant formula. A low protein infant formula will comprise less than 3.5 g of protein/100 kcal for example less than 2.5 g/100 kcal or less than 2 g/100 kcal. The low protein infant formula may be an infant formula formulated for an infant of up to 12 months of age, for example for an infant of 0 to 6 months of age, or an infant of 6 to 12 months of age.

The synthetic nutritional compositions for infants or children may be prepared by methods well known in the art for preparing the type of synthetic nutritional composition in question e.g. infant formulae, follow on formulae, a composition for infants that is intended to be added or diluted with HM e.g. HM fortifier, or food stuffs intended for consumption by infants either alone or in combination with HM e.g. complementary foods.

An infant formula may for example be prepared by blending appropriate quantities of the alpha-lactalbumin-enriched whey protein concentrate with skimmed milk, lactose, vegetable oils and fat soluble vitamins in deionized water. These materials may be blended together in quantities sufficient to provide a final concentration of approximately 400 grams/liter. Mineral salts may then be added to the mixture prior to a high temperature/short time pasteurization step. Appropriate mineral salts include calcium chloride, calcium carbonate, sodium citrate, potassium hydroxide, potassium bicarbonate, magnesium chloride, ferrous sulfate, potassium citrate, zinc sulfate, calcium hydroxide, copper sulfate, magnesium sulfate, potassium iodide, sodium selenite, etc. The mixture may then be homogenized and cooled. Heat-labile vitamins and micronutrients may then be added to the mixture. The mixture may then be standardized with deionized water to a final total solids concentration of about 120 to about 135 for example about 123 grams per litre, which is equivalent to about 670 kcal per litre. The formula may then be sterilized using a conventional ultra-high temperature or standard retort process. This sterilized material may then be placed in appropriate packaging.

In another aspect of the present invention there is provided the use of the α-lactalbumin enriched whey protein extract obtained as disclosed herein to provide an optimised amount of sphingomyelin to an infant or child. As disclosed herein, said α-lactalbumin enriched whey protein extract may be added to a synthetic nutritional composition in an amount effective to provide an optimised concentration of sphingomyelin. The α-lactalbumin enriched whey protein extract obtained as disclosed herein may also provide an optimised amount of α-lactalbumin to an infant or child.

Because human breast milk is the gold standard when it comes to infant nutrition, and because the synthetic nutritional compositions comprising the α-lactalbumin enriched whey protein extract disclosed herein may comprise sphingomyelin in an optimized concentration, they may be used to provide an optimum amount of sphingomyelin to an infant and thereby to ensure optimum sphingomyelin levels in an infant or child.

An optimum sphingomyelin intake has been associated with optimised neurodevelopemt and/or cognitive development, and intelligence.

Accordingly, in another aspect of the present invention there is provided a synthetic nutritional composition for an infant or child for use to treat or prevent sub-optimal neurodevelopment and/or cognitive development wherein, said synthetic nutritional composition comprises an α-lactalbumin enriched whey protein extract obtained as disclosed herein in an amount effective to provide an optimised concentration of sphingomyelin. The composition may be a composition described herein.

The synthetic nutritional composition may be for use to prevent sub-optimal neurodevelopment and/or cognitive development in an infant or child having delayed development, impaired learning, impaired mental performance and impaired memory.

In yet another aspect there is provided the use of a synthetic nutritional composition comprising an α-lactalbumin enriched whey protein extract obtained as disclosed herein in an amount effective to provide an optimised concentration of sphingomyelin to optimise neurodevelopment and/or cognitive development and/or intelligence in an infant or child to whom it is administered. The composition may be a composition described herein.

The synthetic nutritional composition may be used to optimise neurodevelopment and/or cognitive development and/or growth and/or development in a healthy child who is developing normally i.e. non-pathologically with respect to neurodevelopment and cognitive development.

It is within the purview of the skilled person to assess whether an infant or child is developing normally or whether they are suffering from delayed development, impaired learning, impaired mental performance and impaired memory. The skilled person may for example use standardized neurodevelopment and/or cognitive tests including intelligence tests and/or school performance tests. They may for example use the Mullen Scales of Early Learning.

As disclosed hereinabove, the the synthetic nutritional compositions comprising the α-lactalbumin enriched whey protein extract disclosed herein may also comprise α-lactalbumin in an optimized concentration.

Consequently, they may also be used to provide an optimum amount of α-lactalbumin to an infant or child and thereby also ensure optimum α-lactalbumin levels in an infant or child.

Optimised α-lactalbumin levels have been associated with optimised growth and development in infants and children and gastrointestinal (GI) health reducing for example constipation, reflux and vomiting. Accordingly, said synthetic nutritional compositions may also be used to optimise growth and development and GI health in infants and children, and may be used in the treatment of sub-optimal growth or development and in the treatment of GI disorders e.g. constipation, reflux and/or vomiting.

It should be appreciated that all features of the present invention disclosed herein can be freely combined and that variations and modifications may be made without departing from the scope of the invention as defined in the claims. Furthermore, where known equivalents exist to specific features, such equivalents are incorporated as if specifically referred to in this specification.

There now follows a series of non-limiting examples that serve to illustrate the invention.

EXAMPLES

Example 1

1. Materials and Methods 1.1 Raw Materials & Nutritional Powder Products
1.1.1 Infant Formula Raw Materials Three SMP samples were obtained from each of two suppliers: one located in Ireland (SMP A) and the other in the USA (SMP B). Three WPC samples (35% protein) samples were obtained from each of three suppliers; one located in Ireland (WPC A), one in USA (WPC B) and one in Germany (WPC C). Representative WPC 80% enriched in alpha-lactalbumin ingredients were obtained from two suppliers: one located in USA (α-lac A; n=5) and the other in Europe (α-lac B; n=4). All raw materials were commercially available and produced over the period of 2014 to 2015. Protein content was measured by the Dumas method, fat content was determined by a gravimetric method as described by O'Sullivan (2011) and ash content was measured by dry-ashing at 525° C. until a white ash obtained (AOAC, 1995).

1.1.2 Infant Formula Powders

Commercially-available infant formula powder suitable for infants of 0-12 months (n=50) were obtained from Wyeth Nutrition Ltd. Samples were produced over the period of January 2015 to May 2016 using various different ingredient lots; the macronutrient ingredients used are identified in Table 1. In the aforementioned cases the α-lactalbumin enriched WPC used was α-lac A. An experimental formulation was also produced that contained α-lac B but was otherwise identical to the commercially-available infant formula samples (as detailed in Table 1).

TABLE 1

| | |
|---|---|
| Protein sources | Skimmed milk powder, 35% protein |
| | a-Lactalbumin-enriched whey protein concentrate, 80% protein |
| Carbohydrate sources | Lactose a-monohydrate |
| | Oligofructose, DP 2-8 |
| Lipid sources | Palm oil |
| | Soybean oil |
| | Coconut oil |
| | Sunflower oil |
| | Soybean lecithin |
| | Arachidonic acid |
| | Docosahexaenoic acid |

Protein, carbohydrate and lipid sources used in the manufacture of infant formula powders over the period of January 2015 to May 2016. Ingredients met the same respective specifications throughout the duration of the study. Ingredients for each macronutrient source are listed by quantity used, in descending order.

1.1.3. Chemicals and Reagents

Methanol, acetonitrile and chloroform (HPLC-grade) were purchased from VWR (Dublin, Ireland). Phosphatidylglycerol (PG; purity of :=::99%), ammonium formate (purity of 98.7%) and potassium chloride (purity of :=::99%) were purchased from Sigma-Aldrich (Wicklow, Ireland). PG is a phospholipid that does not occur naturally in milk and was used as an internal standard in HPLC-ELSD analyses.

Certified milk lecithin (Spectral Service AG, Germany) containing SM (17.8 g 100 g$^{-1}$) was used as a calibration standard in HPLC analyses. SM 16:0-d31 (Avanti Polar Lipids, Inc., USA), a deuterated version of SM 16:0, was used as an internal standard for MS analyses.

1.2. Determination of Total SM in Raw Materials and Finished Product by HPLC-ELSD 1.2.1. Preparation of Calibration Standards Calibration standard stock solution was prepared by dissolving 140 mg of certified milk lecithin and 10 mg of PG (internal standard) in 100 mL of chloroform/methanol (9/1, v/v) solution. Further dilutions of this solution was performed in chloroform/methanol (9/1, v/v) to yield six standard levels, ranging from 0.012 to 0.249 g $L_{-1}$ for SM and 0.005 to 0.100 g $L^{-1}$ for PG.

1.2.2. Extraction of Test Samples and HPLC-ELSD Analysis

Sample extraction and chromatographic analysis, including chromatography columns and detector settings, were completed according to the procedure as described by Braun et al. (2010) with the following minor modifications. The chromatograph used included an Agilent Technologies 1200 series quaternary pump with degasser, thermostat-controlled column compartment and ELSD (Agilent 1260 Infinity ELSD). EZChrom software package (Agilent Technologies) was used to control the chromatograph and results were analysed using OpenLab software (Agilent Technologies).

1.2.3. PL Identification and Quantification

SM was identified within the certified milk lecithin based on peak location in the elution sequence, retention time and characteristic peak shape, as described by Braun et al. (2010). PG was identified by retention time, based on spiking blank solvent samples with PG standard. A six-point calibration curve was prepared for both SM (0.030-0.630 g $L^{-1}$, $R^2$=:=::0.996) and PG (0.025-0.507 g $L^{-1}$, $R^2$=:=:: 0.996) for quantification. Due to dispersion of results at high concentrations a weighted second degree polynomial regression was used to construct the curves. Quantification of SM was as described by Braun et al. (2010) using the following equation:

$$CSM = \frac{C \cdot IS \cdot mZ}{C^1 \cdot m1 \cdot m3 \cdot 10} \quad (eq.\ 1)$$

where CsM is the concentration of SM (g 100 g$^{-1}$ in the test powder, C is the measured concentration of SM (mg $L^{-1}$ in the test sample from the calibration curve; C' is the measured concentration of PG (mg $L^{-1}$) in the test sample from the calibration curve; IS is the amount of PG internal standard added to the sample (μg); m1 is the mass of powder (g) used to prepare the test sample; m2 is the total mass (g) of the prepared sample solution; m3 is the mass (g) of solution sampled for extraction; 10 is a conversion factor. Result variability was described by the relative standard deviation (RSD), which was calculated by expressing the standard deviation as a percentage of the mean value of each data set.

1.2.4 Simple Linear Regression Analysis to Correlate SM and Lipid Contents

To investigate if there was an apparent correlation between lipid and SM contents with ingredients, simple linear regression analysis was completed. For SMP and WPC 35%, SM and lipid content data for each ingredient supplier was pooled into a single data set; for α-lactalbumin enriched samples only α-lac A was analysed in this way. In each case SM was analysed as a function of ingredient lipid content. Analysis was carried out in Microsoft Excel using the Data Analysis—Regression function; data was fit linearly and the regression coefficient ($R^2$) between 0 and 1 was calculated, where higher values indicate a stronger correlation.

1.3 Analysis of SM Molecular Species by MS:

1.3.1 Extraction of α-Lac Enriched WPC

Extraction was performed by a modified version of the method described by Braun et al. (2010). A powder sample (250 mg) was weighed into a 50-mL glass flask and diluted with 20 mL of pure distilled water. The flask was sealed and heated at 40° C. for 30 min in a pre-heated water bath. A volume of 500 µL of this solution was pipetted into a 20 mL glass tube and mixed with 100 µL of SM 16:0-d31 internal standard (0.02 mg mL-') and 9.5 mL of chloroform/methanol (2/1, v/v) solution. The sample was placed in an ultrasonic bath at 40° C. for 40 min and then centrifuged (2500 rpm for 10 min). The supernatant was transferred into a 20 mL glass tube and mixed with 2 mL of KCl (8.8 g L$^{-1}$) solution. After centrifugation (2500 rpm for 10 min), the aqueous phase was removed using glass Pasteur pipettes and the organic phase was quantitatively transferred to conical-bottomed Extralut vials using glass Pasteur pipettes. The organic solvent was evaporated to dryness under a weak flow of nitrogen gas. The residue was dissolved into 100 lit of chloroform/methanol (9/1, v/v) and analysed.

1.3.2 Analysis of SM by Liquid Chromatography Coupled to Mass Spectrometry

An Accela 1250 liquid chromatograph (ThermoFisher Scientific, Bremen, Germany) equipped with a Hypersil Gold Silica (200 mm×2.1 mm, 1.9 µm particle size) was used for separation of SM species. Solvent A was ammonium-formate (10 mM) and solvent B was acetonitrile. The gradient was as follows: 0-0.5 min isocratic 0% A; 0.5-12 min gradient to 21% A; 12-18 min isocratic 21% A; 18-18.1 min gradient to 40% A; 18.1-19.9 min isocratic 40% A; 19.9-32 min equilibrate at 0% A. Flow rate was 500 µL min$^{-1}$.

An LTQ-Orbitrap XL hybrid mass spectrometer (ThermoFisher Scientific, Bremen, Germany) was used. Electrospray ionization in negative ion mode was employed to form ions at 200° C. nebuliser temperature and 3 kV capillary voltage. Ion source fragmentation was set at 50 V. Nebulizer and auxiliary gases were nitrogen at 20 and 15 units, respectively. Tube lens was adjusted to −135 V, and accumulation time was 100 ms. Other parameters were the typical values optimized during calibration. The Orbitrap was operated at 30,000 resolution in a m/z 100-2,000 range. Data-dependent events were triggered according to an inclusion list containing the accurate masses of SM with loss of methyl group [M-CH3l, applying parent mass width criteria of ±5 ppm. Inclusion list criterion for data-dependent acquisition was established in MS Office Excel by calculating the elemental composition and corresponding accurate mass for SM obtained by the combination of the most common fatty acid (FA) reported in literature (Morrison & Hay, 1970; Ramstedt, Leppimaki, Axberg, & Slotte, 1999; Byrdwell & Perry, 2007; Benoit et al., 2010) on the SM.

Additional mass tagging of m/z 60.02 (between formatted adduct and [M-CH3l ion) was applied in a parent intensity range of 0-100%. Intensity threshold was 100,000 cps; preview mode for FT-MS master scans was enabled. Precursor ion isolation, fragmentation, and detection were performed in the linear ion trap. Only [M-CH3l were fragmented. Activation time was 50 ms, isolation width was 3 Da, normalized collision energy was 25%, activation Q value was 0.250, activation time was 30 ms. Note that the isolation width value 3 Da will result in monoisotopic isolation of the parent ion of [M-CH3l and complete elimination of other isotopomers, as experimentally confirmed. The monoisotopic isolation of the parent ion is of crucial importance to eliminate unnecessary isotopomer interferences in the product ion spectra that would complicate the interpretation of the fragmentation pattern. Using a dynamic exclusion list and 25 s exclusion time, 8 data-dependent events were triggered per two scan cycles (four fragmentation events per one scan cycle). The dynamic exclusion parameters were: repeat count 1; repeat duration 0 s; exclusion list size 25; exclusion duration 18 s; exclusion mass width ±5 ppm.

High-resolution (5 decimals) Orbitrap and nominal-resolution linear ion trap data (two decimals) were extracted using the software Quanbrowser (ThermoFisher Scientific, Bremen, Germany). Chromatographic peak areas were obtained from ion chromatograms extracted in 10 ppm m/z windows. Interpretation of signals for SM identification and quantitation is described below.

1.3.3 Structural Elucidation of SM

Parent ion isolation, fragmentation, and detection were performed at nominal mass resolution in the linear ion trap in parallel to the high-resolution scan performed in the Orbitrap. This hybrid mode of operation allowed the simultaneous acquisition of fragmentation pattern and accurate mass at the chromatographic time scale. The peaks in the SM product ion spectra allowed the determination of FA and sphingoid residues within the SM.

2. Results and Discussion 2.1.1 SM Content of Infant Formula Raw Materials

The protein, lipid, ash and SM contents varied between the ingredients studied (Table 2); SMP A had higher lipid (0.84 g 100 g$^{-1}$) and SM (0.045 g 100 g$^{-1}$) concentrations than SMP B (0.75 and 0.034 g 100 g$^{-1}$, respectively). When the SM levels were compared per gram of lipid, the respective SM contents of SMP A and Bare similar (Table 3). This, along with reasonably high $R^2$ value of 0.7913 when SM content was plotted relative to lipid content (FIG. 1A), suggests that the higher SM content of SMP A may, in part, be attributed to its higher lipid content. This is in agreement with Graves, Beaulieu and Drackley (2007), who proposed that differences in SM contents of summer and winter milk may be attributed to differences in total lipid content. In contrast, Ahn & Schroeder (2002) reported that the total lipid content is not a suitable indicator of total sphingolipid content. The SM contents of the SMP powders reported in this study, ranging from 0.034 to 0.045 g 100 g$^{-1}$, were higher than the value of 0.014 g 100 g$^{-1}$ for SMP reported by Rombaut & Dewettinck (2006). Several factors can affect the concentration of SM in bovine milk, including animal breed and milk fat globule size (Graves, Beaulieu & Drackley, 2007; Lopez, Briard-Bion & Menard, 2014).

WPC A, Band Call had higher SM contents than SMP A and B; mean SM levels ranged from 0.152 g 100 g$^{-1}$ (WPC B) to 0.200 g 100 g$^{-1}$ (WPC A). WPC Chad a relatively variable SM content (8.65% RSD) compared to WPCs A and B (RSD values :S5%). Unlike in the case of SMP, the lipid contents of the WPC samples did not appear to be directly related to SM contents, ranging from 0.058 g 100 g$^{-1}$ (WPC C) to 0.082 g 100 g$^{-1}$ (WPC A). The calculated R 2 value for the relationship between SM and lipid contents in WPC ingredients was 0.204 (FIG. 1B), suggesting a weak relationship between the two. The production process of WPC typically involves separation of whey proteins by membrane filtration, but overall processes can vary somewhat between different ingredient manufacturers; leading to differences in the macro- and micro-nutrient profiles of the WPC ingredients (O'Regan, Ennis & Mulvihill, 2009). It is possible that different manufacturing processes may result in enrichment of SM in the lipid fraction of the product.

The two types of α-lac enriched WPC ingredients analysed varied considerably in both SM and lipid contents. α-Lac A had by far the highest SM and lipid contents of any of the raw materials analysed (1.22 and 9.56 g 100 g$^{-1}$, respectively). α-Lac B had a mean SM level (0.081 g 100 g$^{-1}$) that fell between the mean SM levels in SMP and WPC. While the relatively high lipid content of α-lac A contributes to its high SM content, the SM level is still noticeably higher than all other ingredients analysed even when considered per gram of lipid (Table 3; 0.139 g 100 g$^{-1}$ lipid). The calculated $R^2$ value for the correlation between SM and lipid contents in α-lac A was 0.802 (FIG. 1C), suggesting a reasonably good correlation. The relationship appeared to be negative; i.e. as lipid content increased SM content decreased. The range of lipid contents among the α-lac A powders studied was relatively small (RSD of 2.92%) it was difficult to determine if this negative relationship was of significance. The SM content of α-lac B appeared to be unrelated to the lipid content ($R^2$=0.142; FIG. 1D).

α-Lac enriched whey ingredients can be produced by various processes, which are proprietary to each manufacturer; these processes can differ significantly (O'Regan, Ennis & Mulvihill, 2009). These data suggest that the production process of α-lac A effectively enriches the lipid fraction in SM, compared to α-lac B; with the retention of the polar lipid fraction with the α-lac protein enriched ingredient.

2.2 SM Contents of Raw Materials Relative to Protein Content

The primary reason that SMP, WPC or α-lac enriched WPC are added to infant formulae is to provide a source of protein, which in turn provides amino acids essential for normal growth and development of the infant (Mcsweeney, O'Regan & O'Callaghan, 2013). As such, the quantity of SM that can be provided by an ingredient in a formulation is limited by the volume of that ingredient required to achieve the desired target protein contribution. Therefore, it is of most practical significance to compare SM contents of the ingredients relative to protein content (Table 3). Values have been compared per 100 g of protein rather than per gram as the values were impractically small for comparison purposes when compared per gram of protein. Compared to the other ingredients studied, the SMP ingredients contained a relatively small amount of SM when expressed per gram of protein; SMPs A and B contained 0.118 and 0.093 g 100 g$^{-1}$ protein, respectively. The WPC ingredients were considerably richer in SM when expressed on a constant protein basis, ranging from 0.435 g 100 g$^{-1}$ (WPC B) to 0.546 g 100 g$^{-1}$ (WPC A). α-lac B had the lowest mean SM content per gram of protein of any of the ingredients studied (0.095 g 100 g$^{-1}$). This results from a combination of relatively low SM level in the ingredient (0.081 g 100 gi) coupled with a high mean protein content (84.5 g 100 g$^{-1}$) α-Lac A had by far the highest SM content, on a protein basis, of any of the ingredients studied (1.53 g 100 g$^{-1}$ protein). This suggests that α-lac A is a most suitable ingredient for achieving effective SM enrichment of a formulation. For every gram of protein supplied to a formulation, α-lac may be expected to supply approximately 15-fold the amount of SM that any of the SMP ingredients or α-lac B will provide; compared to the WPC ingredients studied, the difference is approximately 3-fold.

The high protein content combined with the high innate SM content means that, to achieve a target protein content, less of the ingredient would be required but that this powder will still contribute a relatively high amount of SM. For formulations of comparable protein levels it is not possible to achieve a similar SM content using any of the other ingredients studied.

2.3 Identification of SM Species Present in α-Lactalbumin-Enriched WPC

Figure 2:
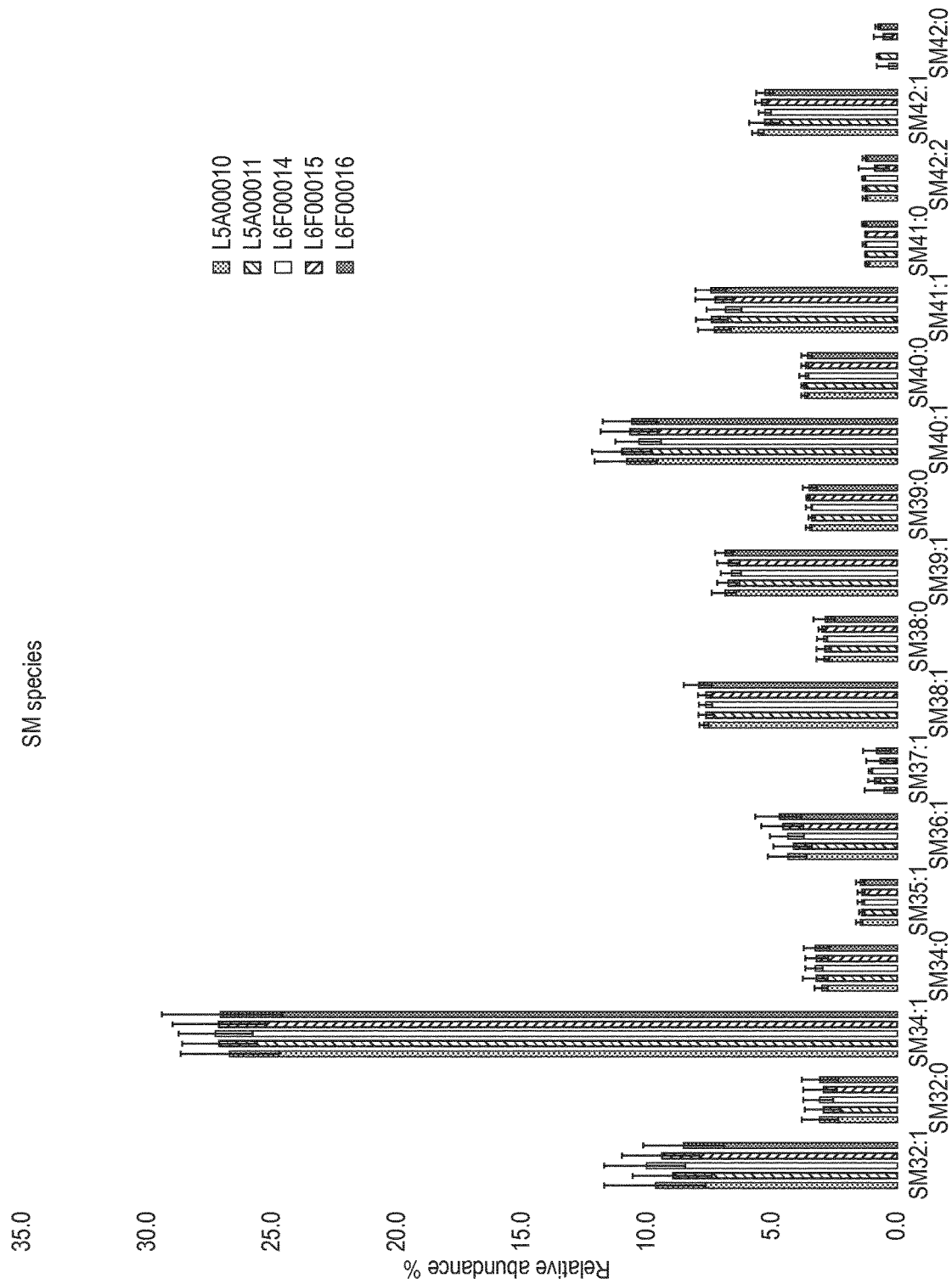
FIG. 2 shows the mean of SM species abundances in bovine SM. Error bars represent the standard deviation (n=4). L5A-00010 and 11 represent α-lactalbumin enriched WPC produced in July and September 2014, respectively; L6F-00014, -15 and -16 represent α-lactalbumin enriched WPC produced in November 2014, April and August 2015, respectively.

The mean SM species abundances are shown in FIG. 2. Within SM, the most abundant species was SM34:1 (tentatively identified as dl 8:1/16:0) followed by SM 40:1 (tentatively identified as dl 8:1/22:0 and d16:1/24:0), SM 32:1 (tentatively identified as d16:1/16:0), SM 38:1 (tentatively identified as d16:1/22:0), SM41:1 (tentatively identified as d18:1/23:0), SM39:1 (tentatively identified as d16:1/23:0) and SM42:1 (tentatively identified as dl 8:1/24:0), in agreement with previous studies performed in bovine milk (Byrdwell & Perry, 2007; Morrison & Hay, 1970; Ramstedt et

TABLE 2

| Material | SM, g 100 g–1 | Protein, g 100 g–1 | Lipid, g 100 g–1 | Ash, g 100 g–1 |
| --- | --- | --- | --- | --- |
| SMP A (n = 3) | 0.045 ± 5.63% | 37.7 ± 6.45% | 0.84 ± 7.62% | 7.58 ± 5.70% |
| SMP B (n = 3) | 0.034 ± 6.18% | 36.4 ± 0.33% | 0.75 ± 5.41% | 8.38 ± 0.42% |
| WPCA (n = 3) | 0.200 ± 5.00% | 36.6 ± 2.05% | 2.97 ± 15.2% | 6.07 ± 2.52% |
| WPC B (n = 3) | 0.152 ± 1.90% | 34.8 ± 0.43% | 2.50 ± 0% | 6.47 ± 0.89% |
| WPC C (n = 3) | 0.177 ± 8.65% | 35.1 ± 0.87 | 3.07 ± 11.5% | 7.98 ± 0.33% |
| a-lac A (n = 5) | 1.22 ± 5.49% | 79.8 ± 1.35% | 9.56 ± 2.92% | 3.18 ± 8.44% |
| a-lac B (n = 4) | 0.081 ± 15.5% | 84.5 ± 2.68% | 1.10 ± 18.2% | 3.68 ± 6.43% |

Levels of sphingomyelin (SM), protein, lipid and ash in skim milk powder (SMP), whey protein concentrate (WPC) and α-lactalbumin enriched WPC (α-lac WPC) powders expressed as percentage on a w/w basis. Values are presented as mean±relative standard deviation of data; sample size (n) is indicated in parentheses.

TABLE 3

| Material | SM, g g–1 lipid | SM, g 100 g–1 protein |
| --- | --- | --- |
| SMP A (n = 3) | 0.053 ± 2.19% | 0.118 ± 3.66% |
| SMP B (n = 3) | 0.048 ± 5.51% | 0.093 ± 5.97% |
| WPCA (n = 3) | 0.082 ± 22.4% | 0.546 ± 4.27% |
| WPC B (n = 3) | 0.061 ± 1.90% | 0.435 ± 1.47% |
| WPC C (n = 3) | 0.058 ± 17.4% | 0.503 ± 9.14% |
| a-lac A (n = 5) | 0.139 ± 13.5% | 1.53 ± 5.72% |
| a-lac B (n = 4) | 0.075 ± 8.7% | 0.095 ± 13.7% |

Levels of SM in SMP, WPC or α-lac ingredients, expressed g g$^{-1}$ lipid or g 100 g$^{-1}$ protein. Values are presented as mean±relative standard deviation of data; sample size (n) is indicated in parentheses.

al., 1999). The other species showed an abundance below 5%. The relative levels of each SM species did not appear to vary based on the date of production of the ingredient (FIG. 2).

Data on SM species in human milk is poor (Blaas, Schuurmann, Bartke, Stahl & Rumpf, 2011) and only SM with sphingoid base d18:0, d18:1, d18:2, t18:1 and t18:2 were considered for analysis, making comparison with this data difficult.

2.4 SM Content of Infant Formula Powders

Analysed SM levels were compared to theoretically calculated levels, based on the typical SM contents of the raw materials used (Table 4) Analytical results generally agreed with the expected values for formulations produced with either α-lac A or α-lac B, suggesting that SM was stable against degradation during the manufacturing processes used. The SM contents of the powders were also expressed 100 mL$^{-1}$, based on their reconstitution instructions for feeding. The SM content for formulations including α-lac A was within the range of reported human milk levels, which vary from 0.002 to 0.018 g 100 mL$^{-1}$ over four months of lactation (McFarland et al., 2016). Therefore, the use of α-lac A was shown to result in a product that had a SM content comparable to human milk. Inclusion of α-lac B in place of α-lac A resulted in a product containing 7 to 8-fold less SM than the latter,

TABLE 4

|  | Theoretical SM g 100 g$^{-1}$ | Analysed SM g 100 g$^{-1}$ | Analysed SM g 100 mL.$^{-1}$ |
|---|---|---|---|
| Infant formula containing a-lac A (n = 50) | 0.092 | 0.085 ± 9.9% | 0.010 |
| Infant formula containing a-lacB (n = 1) | 0.012 | 0.011 | 0.001 |

Theoretical and analysed levels of SM in infant formula powder. Analysed values (g 100 g$^{-1}$) are presented as mean±relative standard deviation of data; sample size (n) is indicated in parentheses. Theoretical SM level was calculated based on the quantities and SM contents of α-lac A and SMP in the recipe and projected per 100 mL based on the reconstitution instructions for the product. Infant formula types were produced with either α-lac A or α-lac B, but were otherwise identical (as per Table 1).

4. Conclusion

The SM levels found in commercially available dairy ingredients used for the manufacture of infant formula can vary, depending on their composition and the manufacturing processes used. This, in turn, affects the SM content of subsequent formulations that use these ingredients. The possibility to enrich ingredients in polar lipids, such as SM, while enriching other key components, such as high-quality protein, is an area with significant potential for further development. Enriching existing ingredients in SM may negate the necessity to add additional exogenous sources, such as MFGM, while still providing infant nutritional products with SM levels similar to those in human milk One of the primary advantages of supplementing SM levels through SM-enriched, high-protein ingredients such as α-lac A is that levels similar to those in human milk can be achieved for both α-lactalbumin and SM. This can be accomplished in a single ingredient and without additional need for fortification of either component. Use of alternative α-lac-enriched WPC powders can provide the desired protein profile but may lack additional benefits such as increased SM levels.

Example 2

Examples of synthetic nutritional compositions (infant formulas) in accordance with the invention is set out in Tables 5 to 8.

TABLE 5

| NUTRIENT | UNITS per Litre | Formula A |
|---|---|---|
| Energy | kcal | 662.0 |
| Energy | kj | 2768.5 |
| Water/Moisture | g | 902.6 |
| Ash | g | 3.4 |
| Protein |  |  |
| Protein | g | 13.4 |
| 65% Whey | g | 8.7 |
| Alpha-lactalbumin | g | 2.3 stemming from 9.5 of alpha-lactalbumin enriched WPE as used in the invention. |
| 35% Casein | g | 4.7 |
| Carbohydrates |  |  |
| Available Carbohydrates | g | 68.6 |
| Carbohydrate | g | 73.6 |
| of which lactose | g | 68.6 |
| of which sugars | g | 68.6 |
| Soluble Dietary Fiber (as oligofructose) | g | 5.0 |
| Lipids |  |  |
| Total Fat | g | 36.0 |
| Fatty acids saturated | g | 14.0 |
| Trans Fatty Acids | g | 0.3 |
| Sphingomyelin | mg | 105.0 |
| Linoleic Acid | mg | 5200.0 |
| Linolenic Acid | mg | 420.5 |
| linoleic:alpha-linolenic acid ratio | ratio | 12.4 |
| ARA | mg | 132.0 |
| DHA | mg | 132.0 |
| ARA/DHA | ratio | 1.0 |
| Vitamins |  |  |
| Vitamin A (Retinol) | mcg RE | 660.1 |
| Beta-carotene | mcg | 150.0 |
| Vitamin D (Cholecalciferol) | mcg D | 12.0 |
| Vitamin E (TE) | mg | 5.8 |
| Vitamin K | mcg | 53.6 |
| Vitamin B1 (Thiamine) | mg | 0.8 |
| Vitamin B2 (Riboflavin) | mg | 0.9 |
| Vitamin B6 (Pyridoxine) | mg | 0.6 |
| Vitamin B12 (Cyanocabalamin) | mcg | 7.0 |
| Niacin | mg | 5.0 |
| Folic Acid | mcg | 219.0 |
| Pantothenic Acid | mg | 3.5 |
| Biotin | mcg | 18.0 |
| Vitamin C (Ascorbic acid) | mg | 80.0 |
| Minerals and Trace Elements |  |  |
| Calcium | mg | 336.7 |
| Phosphorus | mg | 190.0 |
| Ca:P | ratio | 1.8 |
| Magnesium | mg | 45.0 |
| Iron | mg | 8.6 |
| Zinc | mg | 5.5 |
| Manganese | mcg | 50.0 |
| Copper | mg | 0.3 |
| Iodine | mcg | 90.0 |
| Sodium | mg | 175.0 |

TABLE 5-continued

| NUTRIENT | UNITS per Litre | Formula A |
|---|---|---|
| Potassium | mg | 500.0 |
| Chloride | mg | 345.0 |
| Selenium | mcg | 13.5 |
| Other Substances | | |
| Choline | mg | 160.0 |
| Inositol | mg | 45.0 |
| Taurine | mg | 37.6 |
| L-Carnitine | mg | 8.8 |
| Lutein | mg | 0.1 |
| Nucleotides (Total) | mg | 20.8 |
| CMP | mg | 10.4 |
| UMP | mg | 4.0 |
| AMP | mg | 3.2 |
| GMP | mg | 1.6 |
| IMP | mg | 1.6 |

The composition may be for use in an infant of 0 to 6 months.

TABLE 6

| NUTRIENT | UNITS per Litre | Formula B |
|---|---|---|
| Energy | kcal | 659.0 |
| Energy | kj | 2755.0 |
| Water/Moisture | g | 901.0 |
| Ash | g | 5.88 |
| Protein | | |
| Protein | g | 21.3 |
| 40% Whey | g | 8.5 |
| Alpha-lactalbumin | g | 1.70 stemming from 7.02 of alpha-lactalbumin enriched WPE as used in the invention. |
| 60% Casein | g | 12.8 |
| Carbohydrates | | |
| Available Carbohydrates | g | 76.0 |
| of which lactose | g | 76.0 |
| of which sugars | g | 76.0 |
| Soluble Dietary Fiber (as oligofructose) | g | 5.0 |
| Lipids | | |
| Total Fat | g | 30.0 |
| Sphingomyelin | mg | 75.0 |
| Linoleic Acid | mg | 4500.0 |
| Linolenic Acid | mg | 420.0 |
| linoleic:alpha-linolenic acid ratio | ratio | 10.7 |
| ARA | mg | 112.5 |
| DHA | mg | 112.5 |
| ARA/DHA | ratio | 1.0 |
| Vitamins | | |
| Vitamin A (Retinol) | mcg RE | 590.0 |
| Beta-carotene | mcg | 150.0 |
| Vitamin D (Cholecalciferol) | mcg D | 11.0 |
| Vitamin E (TE) | mg | 4.8 |
| Vitamin K | mcg | 34.0 |
| Vitamin B1 (Thiamine) | mg | 0.400 |
| Vitamin B2 (Riboflavin) | mg | 1.10 |
| Vitamin B6 (Pyridoxine) | mg | 0.378 |
| Vitamin B12 (Cyanocabalamin) | mcg | 1.45 |
| Niacin | mg | 4.00 |
| Folic Acid | mcg | 80.0 |
| Pantothenic Acid | mg | 3.5 |
| Biotin | mcg | 13.0 |
| Vitamin C (Ascorbic acid) | mg | 68.0 |

TABLE 6-continued

| NUTRIENT | UNITS per Litre | Formula B |
|---|---|---|
| Minerals and Trace Elements | | |
| Calcium | mg | 650.0 |
| Phosphorus | mg | 456.0 |
| Ca:P | ratio | 1.425 |
| Magnesium | mg | 70.5 |
| Iron | mg | 9.4 |
| Zinc | mg | 4.2 |
| Manganese | mcg | 320.0 |
| Copper | mg | 0.3 |
| Iodine | mcg | 130.0 |
| Sodium | mg | 360.0 |
| Potassium | mg | 900.0 |
| Chloride | mg | 578.0 |
| Selenium | mcg | 20.0 |
| Other Substances | | |
| Choline | mg | 200.0 |
| Inositol | mg | 45.0 |
| Taurine | mg | 37.6 |
| Lutein | mg | 0.200 |
| Nucleotides (Total) | mg | 20.8 |
| CMP | mg | 10.4 |
| UMP | mg | 4.0 |
| AMP | mg | 3.2 |
| GMP | mg | 1.6 |
| IMP | mg | 1.6 |

The composition may be for use in an infant of 6 to 12 months.

TABLE 7

| NUTRIENT | UNITS per Litre | Formula C |
|---|---|---|
| Energy | kcal | 750.0 |
| Energy | kj | 3135.0 |
| Water/Moisture | g | 880.0 |
| Ash | g | 9.05 |
| Protein | | |
| Protein | g | 23.9 |
| 40% Whey | g | 9.6 |
| Alpha-lactalbumin | g | 1.70 stemming from 7.02 of alpha-lactalbumin enriched WPE as used in the invention |
| 60% Casein | g | 14.3 |
| Carbohydrates | | |
| Available Carbohydrates | g | 106.0 |
| Soluble Dietary Fiber (as oligofructose) | g | 5.0 |
| Lipids | | |
| Total Fat | g | 25.4 |
| Sphingomyelin | mg | 75.0 |
| Linoleic Acid | mg | 5690.0 |
| Linolenic Acid | mg | 560.0 |
| linoleic:alpha-linolenic acid ratio | ratio | 10.2 |
| ARA | mg | 26.5 |
| DHA | mg | 98.7 |
| ARA/DHA | ratio | 0.27 |
| Vitamins | | |
| Vitamin A (Retinol) | mcg RE | 575.0 |
| Beta-carotene | mcg | 153.0 |
| Vitamin D (Cholecalciferol) | mcg D | 15.9 |
| Vitamin E (TE) | mg | 9.1 |
| Vitamin K | mcg | 42.7 |
| Vitamin B1 (Thiamine) | mg | 0.621 |
| Vitamin B2 (Riboflavin) | mg | 1.02 |
| Vitamin B6 (Pyridoxine) | mg | 0.509 |

TABLE 7-continued

| NUTRIENT | UNITS per Litre | Formula C |
|---|---|---|
| Vitamin B12 (Cyanocabalamin) | mcg | 2.14 |
| Niacin | mg | 5.1 |
| Folic Acid | mcg | 153.0 |
| Pantothenic Acid | mg | 3.28 |
| Biotin | mcg | 16.3 |
| Vitamin C (Ascorbic acid) | mg | 102.0 |
| Minerals and Trace Elements | | |
| Calcium | mg | 733.0 |
| Phosphorus | mg | 488.0 |
| Ca:P | ratio | 1.5 |
| Magnesium | mg | 61.0 |
| Iron | mg | 7.9 |
| Zinc | mg | 4.3 |
| Manganese | mcg | 804.0 |
| Copper | mg | 0.23 |
| Iodine | mcg | 127.0 |
| Sodium | mg | 483.0 |
| Potassium | mg | 1170.0 |
| Chloride | mg | 580.0 |
| Selenium | mcg | 20.3 |
| Other Substances | | |
| Choline | mg | 244.0 |
| Inositol | mg | 40.7 |
| Taurine | mg | 38.3 |
| Lutein | mg | 0.284 |
| Nucleotides (Total) | mg | 26.4 |
| CMP | mg | 13.2 |
| UMP | mg | 5.1 |
| AMP | mg | 4.1 |
| GMP | mg | 2.0 |
| IMP | mg | 2.0 |

The composition may be for use in a child 1 to 3 years

TABLE 8

| NUTRIENT | UNITS per Litre | Formula D |
|---|---|---|
| Energy | kcal | 930.0 |
| Energy | kj | 3887.0 |
| Water/Moisture | g | 880.0 |
| Ash | g | 10.1 |
| Protein | | |
| Protein | g | 35.0 |
| 40% Whey | g | 14.0 |
| Alpha-lactalbumin | g | 2.05 stemming from 8.47 of alpha-lactalbumin enriched WPE as used in the invention. |
| 60% Casein | g | 21.0 |
| Carbohydrates | | |
| Available Carbohydrates | g | 125.0 |
| Soluble Dietary Fiber (as oligofructose) | g | 5.0 |
| Lipids | | |
| Total Fat | g | 32.0 |
| Sphingomyelin | mg | 87.0 |
| Linoleic Acid | mg | 8500.0 |
| Linolenic Acid | mg | 704.0 |
| linoleic:alpha-linolenic acid ratio | ratio | 12.1 |
| ARA | mg | 26.0 |
| DHA | mg | 97.0 |
| ARA/DHA | ratio | 0.27 |
| Vitamins | | |
| Vitamin A (Retinol) | mcg RE | 417.0 |
| Beta-carotene | mcg | 126.0 |
| Vitamin D (Cholecalciferol) | mcg D | 8.3 |

TABLE 8-continued

| NUTRIENT | UNITS per Litre | Formula D |
|---|---|---|
| Vitamin E (TE) | mg | 6.6 |
| Vitamin K | mcg | 42.0 |
| Vitamin B1 (Thiamine) | mg | 0.40 |
| Vitamin B2 (Riboflavin) | mg | 1.5 |
| Vitamin B6 (Pyridoxine) | mg | 0.52 |
| Vitamin B12 (Cyanocabalamin) | mcg | 2.2 |
| Niacin | mg | 8.0 |
| Folic Acid | mcg | 200.0 |
| Pantothenic Acid | mg | 3.0 |
| Biotin | mcg | 12.0 |
| Vitamin C (Ascorbic acid) | mg | 25.0 |
| Minerals and Trace Elements | | |
| Calcium | mg | 970.0 |
| Phosphorus | mg | 550.0 |
| Ca:P | ratio | 1.8 |
| Magnesium | mg | 99.0 |
| Iron | mg | 12.0 |
| Zinc | mg | 6.2 |
| Manganese | mcg | 1260.0 |
| Copper | mg | 0.35 |
| Iodine | mcg | 63.0 |
| Sodium | mg | 600.0 |
| Potassium | mg | 1370.0 |
| Chloride | mg | 780.0 |
| Selenium | mcg | 30.0 |
| Other Substances | | |
| Choline | mg | 300.0 |
| Inositol | mg | 45.0 |
| Taurine | mg | 37.6 |
| Lutein | mg | 280.0 |

The composition may be for use in a child of 3 to 8 years

The invention claimed is:

1. A method for producing a synthetic nutritional composition comprising sphingomyelin for an infant or child, the method comprising:
   obtaining an α-lactalbumin enriched whey protein extract by a process comprising:
   a. acidifying a first whey protein product to pH 3.3 to 3.8 by addition of an acid selected from the group consisting of hydrochloric acid, phosphoric acid, citric acid, sulfuric acid, and mixtures thereof,
   b. forming a second whey protein product by concentrating proteins in the acidified first whey protein product until a calcium to protein ratio is less than about 0.001 and,
   c. precipitating α-lactalbumin from the second whey protein product, wherein the precipitating includes
      i. diluting the second whey protein product,
      ii. adjusting a pH of the diluted second whey protein product to between 4 and to form a precipitate and soluble proteins, and
      iii. separating the precipitate from the soluble proteins, wherein the precipitate is the α-lactalbumin enriched whey protein extract,
   wherein the α-lactalbumin enriched whey protein extract comprises α-lactalbumin in a concentration of 28% to 40% of total protein and β-lactoglobulin in a concentration of 8% to 33% of the total protein; and
   adding the α-lactalbumin enriched whey protein extract to a composition in an effective amount sufficient to obtain a final concentration of the sphingomyelin in a range found in human breast milk to obtain the synthetic nutritional composition, the composition comprising at least one of a protein source, an oil, a vitamin, or water, the synthetic nutritional composition comprises the sphingomyelin in a concentration of at least 57 mg/L, and the synthetic nutritional composition comprises the α-lactalbumin enriched whey protein extract in a concentration of 0.5 to 1.5 g/L.

2. The method of claim 1, wherein the synthetic nutritional composition comprise an amount of α-lactalbumin in a range found in human breast milk.

3. The method of claim 1, wherein the synthetic nutritional composition is an infant formula comprising 4 to 5 g/L of the α-lactalbumin enriched whey protein extract.

4. The method of claim 1, wherein the synthetic nutritional composition is an infant formula formulated for an infant of 6 to 12 months of age.

5. The method of claim 1, wherein the synthetic nutritional composition is a human breast milk fortifier.

6. The method of claim 1, wherein the proteins in the acidified first whey protein product are concentrated by ultrafiltration and/or diafiltration.

7. The method of claim 1, wherein the proteins in the acidified first whey protein product are concentrated by ultrafiltration through a 10K-100K molecular weight cut off membrane.

8. The method of claim 1, wherein the precipitate is separated from the soluble proteins by ultrafiltration and/or diafiltration.

9. The method of claim 1, wherein the precipitate is separated from the soluble proteins by ultrafiltration through a 5K-50K molecular weight cut off membrane.

10. The method of claim 1, wherein the first whey protein product is acidified to pH 3.5.

11. The method of claim 1, wherein the α-lactalbumin enriched whey protein extract comprises the sphingomyelin in a concentration of 1.1 to 1.8 g per 100 g of protein.

* * * * *